United States Patent

Sone

(10) Patent No.: US 8,032,035 B2
(45) Date of Patent: Oct. 4, 2011

(54) LIGHT DETECTING APPARATUS AND OUTPUT LIGHT INTENSITY CONTROLLER

(75) Inventor: Kyosuke Sone, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 414 days.

(21) Appl. No.: 12/382,906

(22) Filed: Mar. 26, 2009

(65) Prior Publication Data

US 2009/0322233 A1 Dec. 31, 2009

(30) Foreign Application Priority Data

Jun. 30, 2008 (JP) ................................. 2008-171216

(51) Int. Cl.
*H04B 10/04* (2006.01)

(52) U.S. Cl. ........ 398/186; 398/196; 398/197; 398/118; 398/160; 250/205; 250/214 AG; 372/29.014; 372/38.02

(58) Field of Classification Search .................... 398/82, 398/118, 134, 135, 160, 161, 182, 186, 196–198, 398/201, 202; 372/6, 20, 23, 29.014, 38.02; 250/205, 206, 214 R, 214 AG; 315/149, 315/158, 291
See application file for complete search history.

(56) References Cited

U.S. PATENT DOCUMENTS

| | | | | |
|---|---|---|---|---|
| 5,798,853 A * | 8/1998 | Watanabe | ...................... | 398/150 |
| 6,122,419 A * | 9/2000 | Kurokawa et al. | ............... | 385/31 |
| 6,489,600 B1 * | 12/2002 | Taguchi | ........................ | 250/205 |
| 7,164,865 B2 * | 1/2007 | Tatsuno et al. | ................. | 398/201 |
| 7,339,717 B2 * | 3/2008 | Peer et al. | ...................... | 359/326 |
| 7,555,216 B2 * | 6/2009 | Yoshino et al. | .................. | 398/77 |

FOREIGN PATENT DOCUMENTS

JP 2004-179233 6/2004

* cited by examiner

*Primary Examiner* — Haiss Philogene
(74) *Attorney, Agent, or Firm* — Staas & Halsey LLP

(57) ABSTRACT

A light detecting apparatus receives input light branched and output by a branching device, to calculate transmittance and reflectivity from the input light, acquires a wavelength corresponding to the calculated transmittance and reflectivity to calculate a gain value corresponding to input light intensity, acquires a driving current value corresponding to a calculated gain value and an acquired wavelength, and outputs an acquired driving current value.

4 Claims, 5 Drawing Sheets

FIG.3

| | WAVELENGTH | | | |51|
|---|---|---|---|---|
| | $\lambda_1$ | $\lambda_2$ | $\cdots$ | $\lambda_n$ |
| TRANSMITTANCE | $T_1$ | $T_2$ | $\cdots$ | $T_n$ |
| REFLECTIVITY | $R_1$ | $R_2$ | $\cdots$ | $R_n$ |

FIG.4

GAIN

| | $G_1$ | $G_2$ | $\cdots$ | $G_n$ | 52 |
|---|---|---|---|---|---|
| $\lambda_1$ | $I_{11}$ | $I_{12}$ | $\cdots$ | $I_{1n}$ | |
| $\lambda_2$ | $I_{21}$ | $I_{22}$ | $\cdots$ | $I_{2n}$ | |
| $\vdots$ | $\vdots$ | $\vdots$ | $\vdots$ | $\vdots$ | |
| $\lambda_n$ | $I_{n1}$ | $I_{n2}$ | $\cdots$ | $I_{nn}$ | |

WAVELENGTH

LIGHT DETECTING APPARATUS AND OUTPUT LIGHT INTENSITY CONTROLLER

CROSS-REFERENCE TO RELATED APPLICATION(S)

This application is based upon and claims the benefit of priority of the prior Japanese Patent Application No. 2008-171216, filed on Jun. 30, 2008, the entire contents of which are incorporated herein by reference.

FIELD

The embodiment(s) discussed herein is (are) directed to a light detecting apparatus and an output light intensity controller.

BACKGROUND

In an optical communication network, conventionally, to improve minimum sensitivity of an optical receiver, there is a method that an input optical signal is amplified by arranging an optical preamplifier at a previous stage of the optical receiver. Specifically, to expand an input dynamic range of a light receiving system, the optical preamplifier is used by automatic level control (ALC), which constantly controls an output level with respect to an input, so that constant optical power is input to an optical receiver at a subsequent stage.

As an optical amplifier used for cases including a light receiving system, an erbium doped fiber amplifier (EDFA) is generally used. However, because the EDFA pumps a fiber bundle having a restriction in a folding radius, its downsizing has been difficult. Further, with the EDFA, it has been also difficult to realize high-speed ALC such that the ALC is performed for every burst signal.

Recently, therefore, a semiconductor optical amplifier (SOA), which can be manufactured by the same equipment and process as those of a semiconductor laser, and can realize downsizing, low consumption power, low cost, and high-speed ALC, has attracted attention. Further, various techniques for realizing high-speed ALC capable of responding to the burst signal using the SOA as the optical preamplifier to perform feed-forward control have been disclosed (for example, see Japanese Laid-open Patent Publication No. 2004-179233).

According to these conventional techniques, however, when signal light of a different wavelength or different light intensity is input, there is a problem that the signal light cannot be amplified at high speed and with constant optical output.

In the conventional techniques, because an optical gain value of the SOA is different depending on the wavelength, an optical filter having an inverse characteristic to the wavelength characteristic is arranged at a previous stage of the SOA, thereby compensating wavelength dependency. In the conventional techniques, an input optical signal of the optical preamplifier is branched to detect a power of the input optical signal, and a driving current of the SOA is controlled so that a detected value matches a reference voltage, thereby controlling the optical output of the SOA to a constant value.

However, as depicted in FIG. 8, because the wavelength characteristic of the optical gain of the SOA changes according to the driving current, it is difficult to compensate the wavelength characteristic of the SOA over the whole driving current only by arranging the optical filter having a fixed wavelength characteristic at a previous stage of the SOA. As a result, according to the conventional techniques, when the signal light of a different wavelength and light intensity is input to the SOA, the signal light cannot be amplified at high speed and with the constant optical output. FIG. 8 depicts change in the wavelength characteristic due to the driving current of the SOA output optical power.

SUMMARY

According to an aspect of an embodiment, a light detecting apparatus includes a wavelength-specification storage unit that stores a wavelength specified based on transmittance and reflectance of light in association with the transmittance and the reflectance; a driving-current storage unit that stores a driving current value indicating a current value required for driving a semiconductor optical amplifier that amplifies light and outputs the amplified light, for each gain value corresponding to an input light intensity, which is an intensity of light, in association with the wavelength; a wavelength acquiring unit that receives input light branched by a branching device that branches the input light, to calculate transmittance and reflectance of the received input light, and acquires a wavelength corresponding to the calculated transmittance and reflectance from the wavelength-specification storage unit; a driving-current-value acquiring unit that calculates a gain value corresponding to the input light intensity, which is an intensity of the input light received from the branching device, and acquires a driving current value corresponding to a calculated gain value and a wavelength acquired by the wavelength acquiring unit from the driving-current storage unit; and an output unit that outputs a driving current value acquired by the driving-current-value acquiring unit to a driving-current control circuit that controls the driving current, which is a current required for driving the semiconductor optical amplifier serially connected to the branching device and an optical delay device that delays and outputs the input light branched by the branching device.

According to another aspect of an embodiment, an output light intensity controller includes an optical coupler that branches an input light; an optical delay device that receives the input light branched by the optical coupler, and delays and outputs the received input light; a semiconductor optical amplifier that amplifies and outputs an output light output from the optical delay device; a light detecting apparatus that receives the input light branched by the optical coupler, and determines and outputs a driving current value based on the received input light; and a driving-current control circuit that drives and controls the semiconductor optical amplifier based on the driving current value output by the light detecting apparatus. In the output light intensity controller, the light detecting apparatus includes a wavelength-specification storage unit that stores a wavelength specified based on transmittance and reflectance of light in association with the transmittance and the reflectance; a driving-current storage unit that stores a driving current value indicating a current value required for driving the semiconductor optical amplifier for each gain value corresponding to an input light intensity, which is an intensity of light, in association with the wavelength; a wavelength acquiring unit that receives the input light branched by the optical coupler, to calculate transmittance and reflectance of the received input light, and acquires a wavelength corresponding to the calculated transmittance and reflectance from the wavelength-specification storage unit; a driving-current-value acquiring unit that calculates a gain value corresponding to the input light intensity, which is an intensity of the input light received from the optical coupler, and acquires a driving current value corresponding to a calculated gain value and a wavelength acquired by the wavelength acquiring unit from the driving-current storage unit; and an output unit that outputs a driving current value acquired by the driving-current-value acquiring unit to the driving-current control circuit that controls the driving current, which is a current required for driving the semiconductor optical amplifier serially connected to the optical coupler and the optical delay device.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 3 is an example of information stored in a wavelength specification table according to the embodiment;

FIG. 4 is an example of information stored in a driving current table according to the embodiment;

DESCRIPTION OF EMBODIMENT(S)

Exemplary embodiments of a light detecting apparatus according to the present invention will be explained below in detail with reference to the accompanying drawings.

Figure 1:
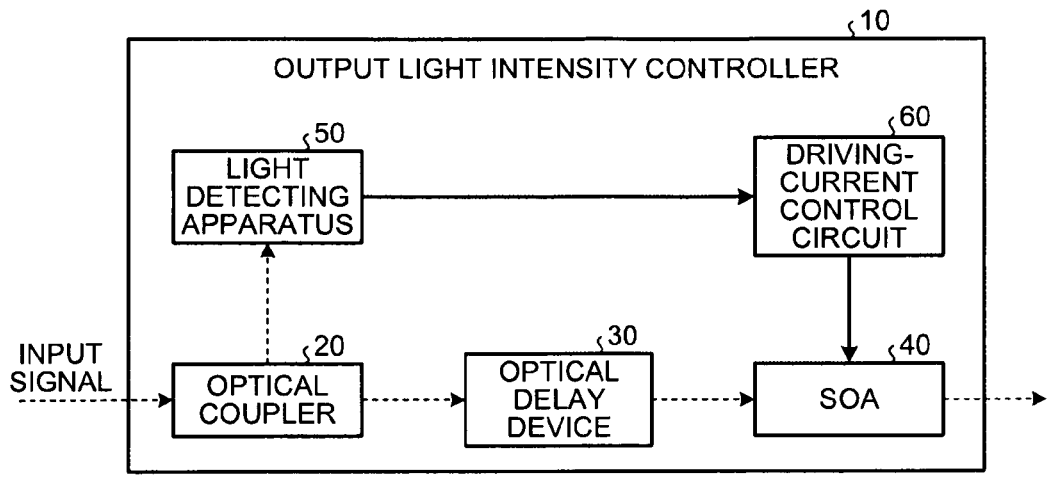
FIG. 1 is a schematic diagram for explaining an outline of a light detecting apparatus according to an embodiment.

An outline of a light detecting apparatus according to an embodiment of the present invention is explained first with reference to FIG. 1. FIG. 1 is a schematic diagram for explaining the outline of the light detecting apparatus.

As depicted in FIG. 1, the light detecting apparatus is included in an output light intensity controller 10. The output light intensity controller 10 includes an optical coupler 20, an optical delay device 30, a semiconductor optical amplifier (SOA) 40, a light detecting apparatus 50, and a driving-current control circuit 60, and controls the intensity of output light, which is light to be output, to be constant based on input light to be input.

The optical coupler 20, the optical delay device 30, and the SOA 40, which constitute an optical system (see dotted line in FIG. 1), are serially arranged, and the light detecting apparatus 50 and the driving-current control circuit 60, which constitute an electric system (see solid line in FIG. 1), are arranged serially as a feed-forward circuit with respect to the above optical system.

The optical coupler 20 branches a signal input (input light) to be input. For example, the optical coupler 20 receives the input light to be input to the output light intensity controller 10, and branches the received input light and outputs the light to the optical delay device 30 and the light detecting apparatus 50.

The optical delay device 30 receives the input light branched by the optical coupler 20, and delays and outputs the received input light. For example, the optical delay device 30 receives the input light branched and output by the optical coupler 20, and delays the received input light to output the light to the SOA 40. The delay by the optical delay device 30 is set equal to a delay time of an electric signal by the light detecting apparatus 50 and the driving-current control circuit 60 constituting the electric system.

The SOA 40 is a semiconductor optical amplifier that amplifies and outputs the output light output by the optical delay device 30. For example, the SOA 40 amplifies and outputs the output light from the optical delay device 30, and driving of the SOA 40 is controlled by the driving-current control circuit 60 described later.

The light detecting apparatus 50 receives the input light branched by the optical coupler 20, and determines and outputs a driving current value based on the received input light. For example, the light detecting apparatus 50 receives the input light branched and output by the optical coupler 20, determines the driving current value indicating a value of the current required for driving the SOA 40 based on the received input light, and outputs the driving current value to the driving-current control circuit 60.

Further, the light detecting apparatus 50 has a wavelength recognizing function. Specifically, the light detecting apparatus 50 includes an optical filter, in which a transmission characteristic and a reflection characteristic linearly change in a desired wavelength range, and a photodetector (PD) that receives transmitted light and reflected light, respectively, and specifies a wavelength based on transmittance or reflectivity. The light detecting apparatus 50 not only specifies the wavelength but also detects an optical input power.

The driving-current control circuit 60 drives and controls the SOA 40 based on the driving current value output by the light detecting apparatus 50. For example, the driving-current control circuit 60 operates corresponding to the driving current value output by the light detecting apparatus 50, and drives and controls the SOA 40 according to the output driving current value.

As a flow of the input light in the respective circuits, for example, the input light is branched to two to the optical delay device 30 and the light detecting apparatus 50 by an intensity ratio of "9:1" in the optical coupler 20. The light input to the optical delay device 30 with the intensity ratio of 90% by the optical coupler 20 enters into the SOA 40, with a delay given similar to that of the electric signal flowing in the electric control system. Subsequently, the light detecting apparatus 50, to which the light is input with the intensity ratio of 10% by the optical coupler 20, outputs the driving current value corresponding to the wavelength and the intensity of the input light to the driving-current control circuit 60. Thereafter, the SOA 40 to which the driving current is applied under the control of the driving-current control circuit 60 amplifies the input light to a constant light intensity and outputs the light. The intensity ratio of optical branching by the optical coupler 20 is not limited to the above value, and is different according to the setting of the apparatus.

Because the light detecting apparatus controls the output light intensity at high speed even if there is a fluctuation in the input light intensity, even when the signal light of a different wavelength or different light intensity is input to the SOA, the light can be amplified with constant optical output at high speed.

Figure 2:
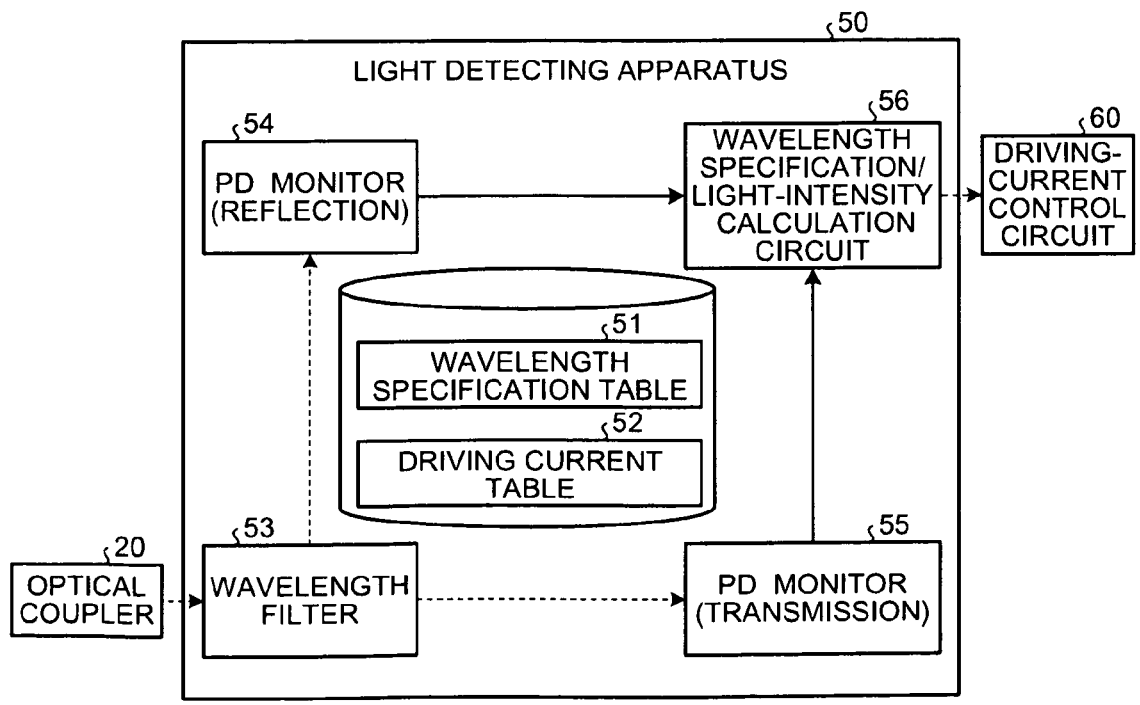
FIG. 2 depicts a configuration of the light detecting apparatus according to the embodiment.

A configuration of the light detecting apparatus according to the embodiment depicted in FIG. 1 is explained with reference to FIG. 2. FIG. 2 depicts the configuration of the light detecting apparatus.

As depicted in FIG. 2, the light detecting apparatus 50 includes a wavelength specification table 51, a driving current table 52, a wavelength filter 53, a PD (reflection) monitor 54, a PD (transmission) monitor 55, and a wavelength specification/light-intensity calculation circuit 56.

The wavelength specification table 51 stores a wavelength specified according to transmittance and reflectivity of light in association with the transmittance and the reflectivity. Specifically, as depicted in FIG. 3, the wavelength specification table 51 stores wavelengths "$\lambda_1$" to "$\lambda_n$" specified from the transmittance and the reflectivity in association with transmittance "$T_1$" to "$T_n$" and reflectivity "$R_1$" to "$R_n$". For example, the wavelength specification table 51 stores wavelength "$\lambda_1$" in association with transmittance "$T_1$" and reflectivity "$R_1$". FIG. 3 is an example of information stored in the wavelength specification table 51.

The driving current table 52 stores the driving current value indicating a value of the current required for driving the SOA 40 that amplifies and outputs the light for each gain value corresponding to the input light intensity, which is an intensity of light, in association with the wavelength specified based on the transmittance and the reflectivity.

Specifically, as depicted in FIG. 4, the driving current table 52 stores driving current values "$l_{11}$" to "$l_{nn}$" indicating the value of the current required for driving the SOA 40 that amplifies and outputs the light for each gain value "$G_1$" to "$G_n$" corresponding to the input light intensity, which is an intensity of light, in association with the wavelengths "$\lambda_1$" to "$\lambda_n$" specified based on the transmittance and the reflectivity. For example, the driving current table 52 stores the driving current value "$l_{11}$" for the gain value "$G_1$" corresponding to the input light intensity in association with the wavelength "$\lambda_1$". FIG. 4 is an example of information stored in the driving current table according to the embodiment.

Figure 5:
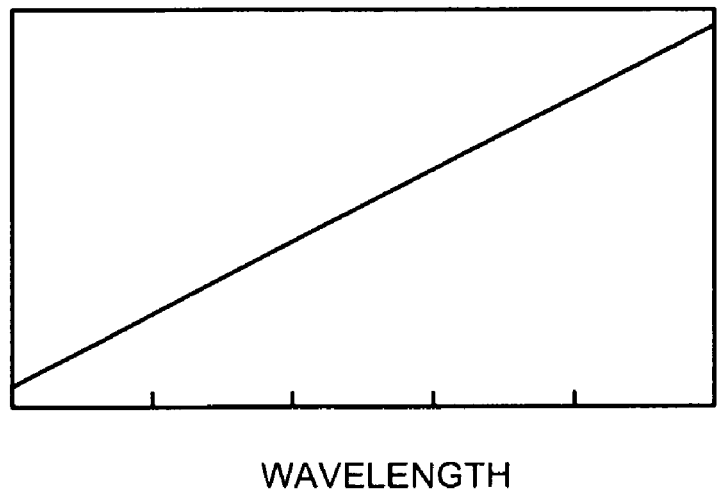
FIG. 5 is a schematic diagram for explaining a reflection characteristic.

The wavelength filter 53 is an optical filter that acquires the wavelength and reflected light intensity when a transmission characteristic or reflection characteristic change linearly in the desired wavelength range. For example, when the signal light is input from the optical coupler 20, as depicted in FIG. 5, the wavelength filter 53 acquires the wavelength and the reflected light intensity when the reflection characteristic changes linearly in the desired wavelength range, to output the wavelength and the reflected light intensity to the PD (reflection) monitor 54. FIG. 5 is a schematic diagram for explaining the reflection characteristic.

Figure 6:
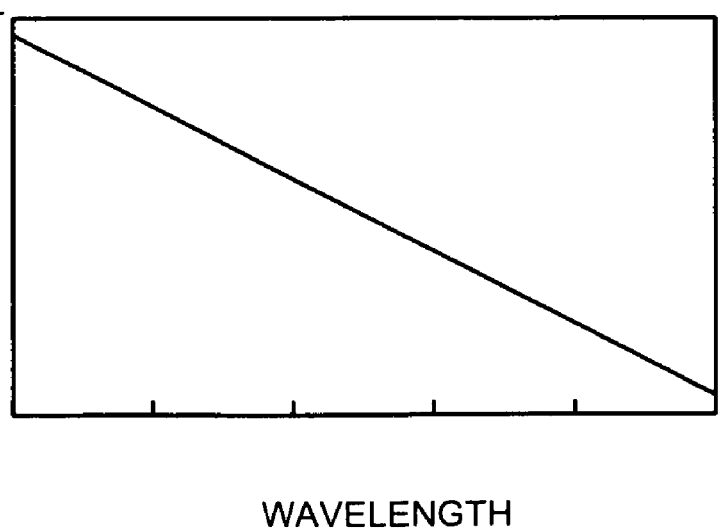
FIG. 6 is a schematic diagram for explaining a transmission characteristic.

For example, when the signal light is input from the optical coupler 20, as depicted in FIG. 6, the wavelength filter 53 acquires the wavelength and the transmitted light intensity when the transmission characteristic changes linearly in the desired wavelength range, to output the wavelength and the transmitted light intensity to the PD (transmission) monitor 55. FIG. 6 is a schematic diagram for explaining the transmission characteristic.

The PD (reflection) monitor 54 receives the reflected light output by the wavelength filter 53, and outputs a monitor value of the above PD to the wavelength specification/light-intensity calculation circuit 56. The PD (transmission) monitor 55 receives the transmitted light output by the wavelength filter 53, and outputs a monitor value of the above PD to the wavelength specification/light-intensity calculation circuit 56.

The wavelength specification/light-intensity calculation circuit 56 receives the monitor value output from the PD (reflection) monitor 54 and the PD (transmission) monitor 55, to calculate the transmittance and the reflectivity based on the received monitor value, and acquires the wavelength corresponding to the calculated transmittance and reflectivity from the wavelength specification table 51.

The wavelength specification/light-intensity calculation circuit 56 calculates a gain value corresponding to the input light intensity, which is an intensity of input light, and acquires a driving current value corresponding to the calculated gain value and the acquired wavelength from the driving current table 52.

Subsequently, the wavelength specification/light-intensity calculation circuit 56 outputs the acquired driving current value to the driving-current control circuit 60 that controls the driving current, which is a current required for driving the SOA 40 serially connected to the optical coupler and the optical delay device 30 that delays and outputs the input light branched by the optical coupler 20.

Specifically, the wavelength specification/light-intensity calculation circuit 56 receives the reflected light intensity and the transmitted light intensity, which are the monitor values output from the PD (reflection) monitor 54 and the PD (transmission) monitor 55. The wavelength specification/light-intensity calculation circuit 56 then calculates the reflectivity "$R_1$" and the transmittance "$T_1$" based on the received reflected light intensity and the transmitted light intensity. The reflectivity is calculated by an equation of "reflectivity=reflected light intensity÷(transmitted light intensity+reflected light intensity)", and the transmittance is calculated by an equation of "transmittance=transmitted light intensity÷(transmitted light intensity+reflected light intensity)".

Subsequently, the wavelength specification/light-intensity calculation circuit 56 acquires the wavelength "$\lambda_1$" corresponding to the calculated reflectivity "$R_1$" and transmittance "$T_1$" from the wavelength specification table 51. Thereafter, the wavelength specification/light-intensity calculation circuit 56 calculates the input light intensity, which is an intensity of the input light. The input light intensity is calculated by an equation of "(transmitted light intensity+reflected light intensity)÷filter loss". The filter loss is a loss in the wavelength filter 53.

The wavelength specification/light-intensity calculation circuit 56 calculates the gain value "$G_1$" corresponding to the calculated input light intensity, to obtain the driving current value "$l_{11}$" corresponding to the calculated gain value "$G_1$" and the acquired wavelength "$\lambda_1$" from the driving current table 52. Subsequently, the wavelength specification/light-intensity calculation circuit 56 outputs the acquired driving current value "$l_{11}$" to the driving-current control circuit 60 that controls the driving current, which is a current required for driving the SOA 40 serially connected to the optical coupler and the optical delay device 30, and instructs the driving of the SOA 40.

Figure 7:
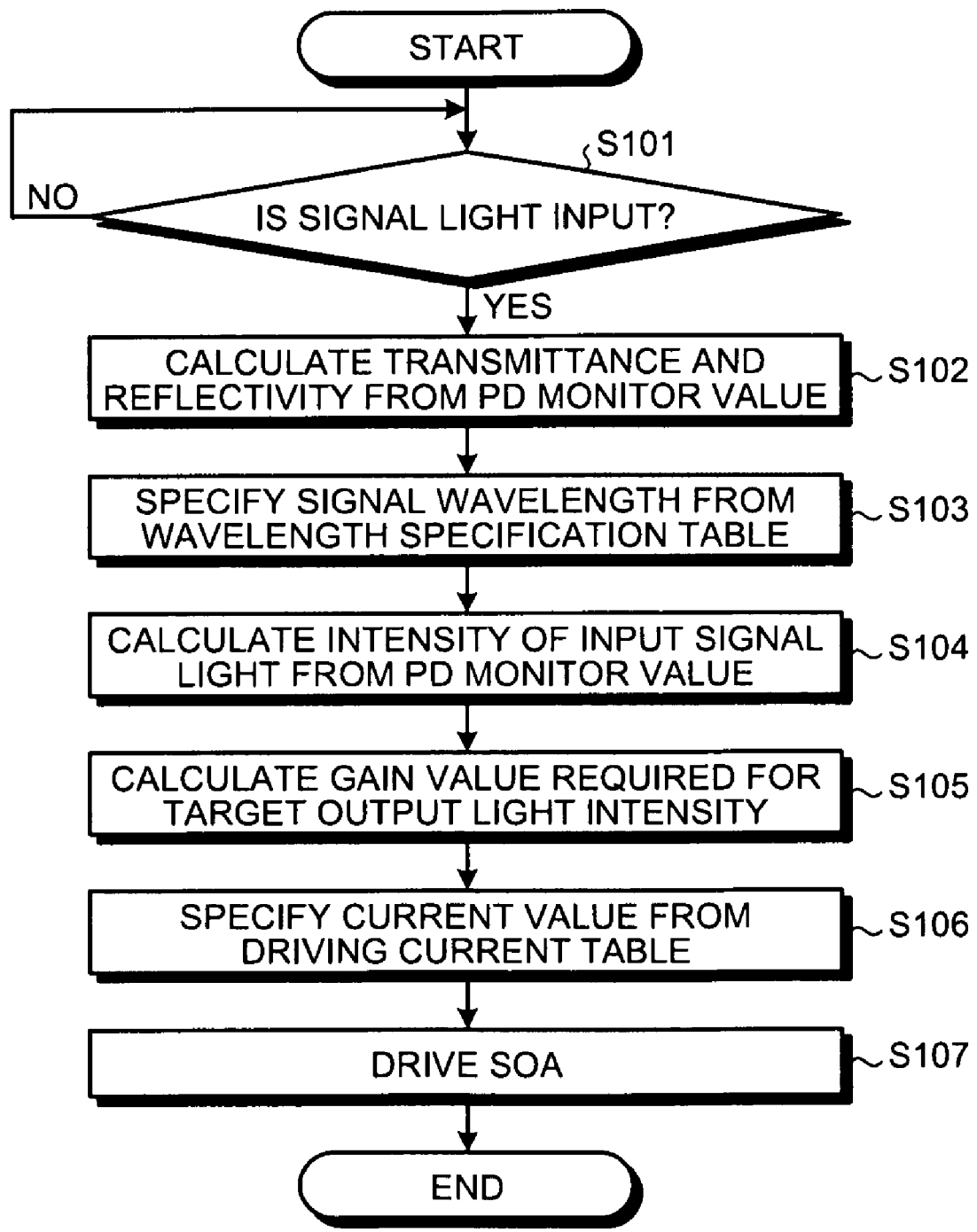
FIG. 7 is a flowchart of a driving-current-value output process performed by the light detecting apparatus according to the embodiment.
Figure 8:
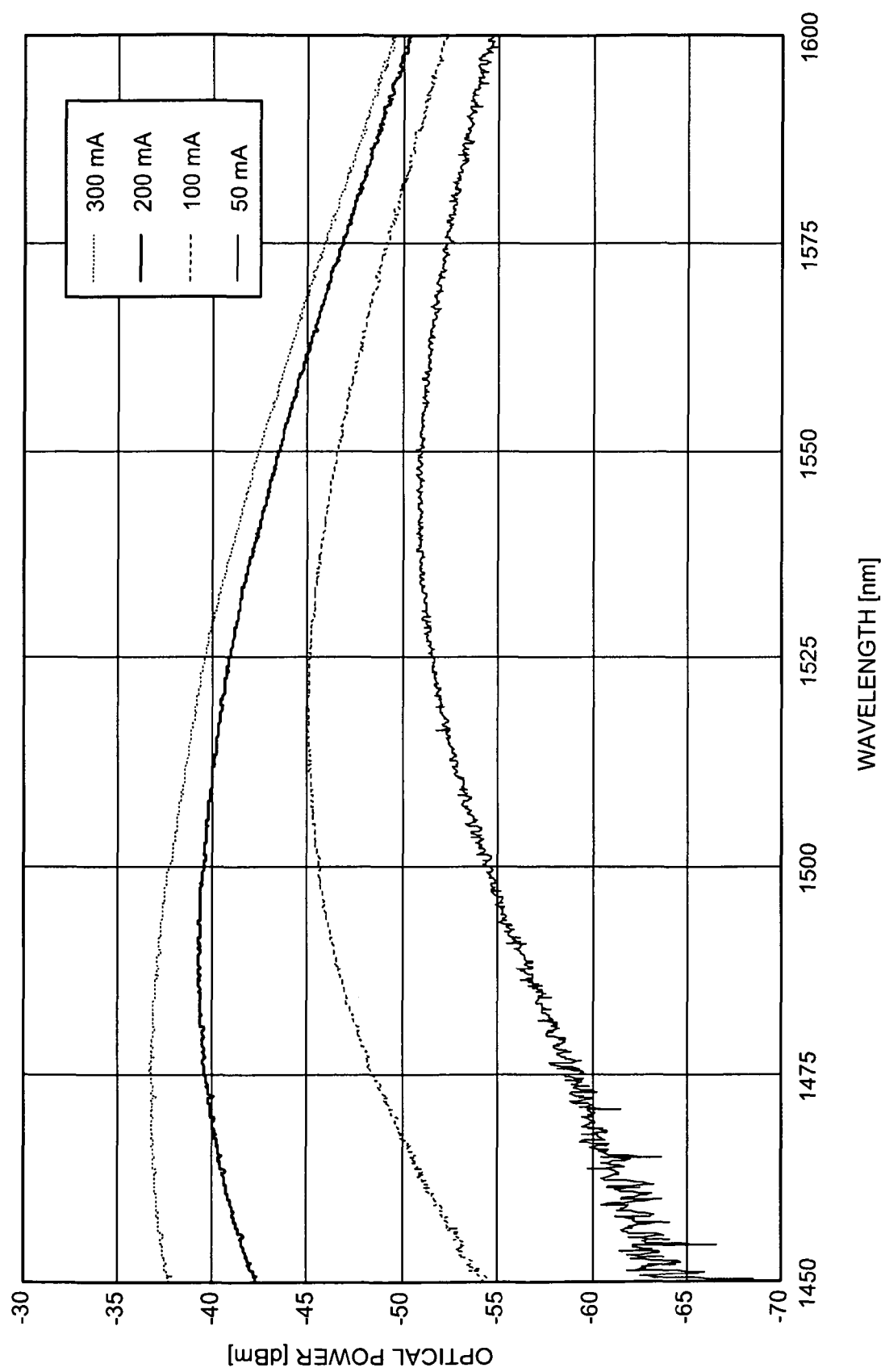
FIG. 8 depicts change in a wavelength characteristic due to driving current of SOA output optical power.

A flow of a driving-current-value output process performed by the light detecting apparatus 50 is explained next with reference to FIG. 7. FIG. 7 is a flowchart of the driving-current-value output process.

As depicted in FIG. 7, when signal light is input from the optical coupler 20 (Yes at Step S101), the light detecting apparatus 50 acquires the wavelength when the reflection characteristic and the transmission characteristic change linearly in the desired wavelength range, the reflected light intensity, and the transmitted light intensity. The light detecting apparatus 50 then calculates the reflectivity "$R_1$" and the transmittance "$T_1$" based on the acquired reflected light intensity and transmitted light intensity (Step S102).

Subsequently, the light detecting apparatus 50 acquires the wavelength "$\lambda_1$" corresponding to the calculated reflectivity "$R_1$" and transmittance "$T_1$" from the wavelength specification table 51 (Step S103). Thereafter, the light detecting apparatus 50 calculates the input light intensity, which is an intensity of the input light based on the acquired transmitted light intensity and reflected light intensity (Step S104).

The light detecting apparatus 50 calculates the gain value "$G_1$" corresponding to the calculated input light intensity (Step S105). The light detecting apparatus 50 then acquires the driving current value "$l_{11}$" corresponding to the calculated gain value "$G_1$" and the acquired wavelength "$\lambda_1$" from the driving current table 52 (Step S106). Subsequently, the light detecting apparatus 50 outputs the acquired driving current value "$l_{11}$" to the driving-current control circuit 60 that controls the driving current, which is a current required for driving the SOA 40, and instructs the driving of the SOA 40 (Step S107).

The driving-current control circuit 60 having received the instruction to drive the SOA 40 from the light detecting apparatus 50 drives the SOA 40 according to the driving current value "$l_{11}$". The SOA 40 amplifies and outputs the light received from the optical delay device 30, which delays and outputs the input light branched by the optical coupler 20.

As described above, the light detecting apparatus 50 automatically controls the gain by feed-forward control by including the wavelength recognizing function in the output light intensity controller 10 including the optical delay device 30. Therefore, even when the signal light of a different wavelength or different light intensity is input to the SOA, the signal light can be amplified at high speed with constant optical output, and instantaneous correspondence to output control of not only a continuous optical signal but also a burst optical signal is possible.

That is, even when the signal level is changed at high speed such as the burst signal, the light detecting apparatus 50 can control the output light level constantly. Further, even when light of different wavelengths is present together, the output light level can be controlled constantly.

For example, the light detecting apparatus 50 receives the input light output from the optical coupler 20. The light detecting apparatus 50 then calculates the reflectivity "$R_1$" and the transmittance "$T_1$" based on the reflected light intensity and the transmitted light intensity of the received input light. Subsequently, the light detecting apparatus 50 acquires the wavelength "$\lambda_1$" corresponding to the calculated reflectivity "$R_1$" and transmittance "$T_1$" from the wavelength specification table 51 storing the wavelength specified based on transmittance and reflectivity of the light in association with the transmittance and the reflectivity. Thereafter, the light detecting apparatus 50 calculates the gain value "$G_1$" corresponding to the calculated input light intensity. The light detecting apparatus 50 then acquires the driving current value "$l_{11}$" corresponding to the calculated gain value "$G_1$" and the acquired wavelength "$\lambda_1$" from the driving current table 52, which stores the driving current value for each gain value corresponding to the input light intensity, in association with the wavelength specified based on the transmittance and the reflectivity. Subsequently, the light detecting apparatus 50 outputs the acquired driving current value "$l_{11}$" to the driving-current control circuit 60 that controls the driving current required for driving the SOA 40 serially connected to the optical coupler 20 and the optical delay device 30, and instructs the driving of the SOA 40. As a result, even when the signal light of a different wavelength or different light intensity is input to the SOA, the light detecting apparatus 50 can amplify the signal light at high speed with constant optical output, and can instantaneously correspond to the output control of not only a continuous optical signal but also a burst optical signal.

While an exemplary embodiment of the present invention has been explained above, the invention can be carried out in various different forms other than the above embodiment. Another embodiment of the present invention is explained by dividing its configuration into acquisition of the wavelength, control of the output light intensity, and a configuration of the light detecting apparatus.

First, acquisition of the wavelength will be explained. In the embodiment, a case that the wavelength corresponding to the calculated transmittance and reflectivity is acquired from the wavelength specification table 51 has been explained. However, the present invention is not limited thereto, and the wavelength corresponding to either one of the calculated transmittance and reflectivity can be acquired from the wavelength specification table 51.

For example, the light detecting apparatus 50 acquires the wavelength "$\lambda_1$" stored in the wavelength specification table 51, using either one of the calculated reflectivity "$R_1$" and transmittance "$T_1$" having a higher characteristic of the transmitted light intensity or reflected light intensity depicted in FIGS. 5 and 6. As a result, the light detecting apparatus 50 can acquire the wavelength more accurately even for weak light branched by the optical coupler 20, using one of the transmittance and the reflectivity having a higher characteristic of light intensity.

Next, control of the output light intensity will be explained. In the embodiment, processing of the light detecting apparatus 50 having the wavelength recognizing function for compensating the wavelength dependency of the gain of the SOA 40 has been explained. However, the present invention is not limited thereto, and control can be performed to compensate the wavelength dependency of the optical receiver or the like arranged at a subsequent stage of the SOA 40, which is a semiconductor optical amplifier. For example, the light detecting apparatus 50 acquires a wavelength predetermined by machine setting of, for example, the optical receiver arranged at a subsequent stage, and controls the output light intensity to compensate the wavelength dependency.

Further, a configuration of the light detecting apparatus will be explained. The process procedures, control procedures, specific names, and information including various kinds of data and parameters (for example, various kinds of data stored in the wavelength specification table 51 and the driving current table 52 depicted in FIG. 2) depicted in the present specification or the drawings can be arbitrarily changed unless otherwise specified.

The respective components of respective devices depicted in the drawings are functionally conceptual, and are not necessarily configured physically as depicted in the drawings. That is, a specific form of dispersion and integration of respective devices is not limited to the depicted ones. For example, the wavelength specification/light-intensity calculation circuit 56 can be divided into a "wavelength acquiring unit" that calculates the transmittance and the reflectivity to acquire the wavelength, and a "driving-current acquiring unit" that calculates the gain value corresponding to the input light intensity to acquire the driving current value corresponding to the gain value and the acquired wavelength, and the whole or a part thereof can be functionally or physically dispersed and integrated in an arbitrary unit, according to various kinds of load and status of use. In addition, all or an arbitrary part of various processing functions performed by the respective devices can be realized by a central processing unit (CPU) or a program analyzed and executed by the CPU, or can be realized as hardware by a wired logic.

According to the light detecting apparatus of the embodiment, even if the signal light of a different wavelength or different light intensity is input to the SOA, the signal light can be amplified at high speed with constant optical output.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A light detecting apparatus comprising:
   a wavelength-specification storage unit that stores a wavelength specified based on transmittance and reflectance of light in association with the transmittance and the reflectance;
   a driving-current storage unit that stores a driving current value indicating a current value required for driving a semiconductor optical amplifier that amplifies light and outputs the amplified light, for each gain value corresponding to an input light intensity, which is an intensity of light, in association with the wavelength;
   a wavelength acquiring unit that receives input light branched by a branching device that branches the input light, to calculate transmittance and reflectance of the received input light, and acquires a wavelength corresponding to the calculated transmittance and reflectance from the wavelength-specification storage unit;
   a driving-current-value acquiring unit that calculates a gain value corresponding to the input light intensity, which is an intensity of the input light received from the branching device, and acquires a driving current value corresponding to a calculated gain value and a wavelength acquired by the wavelength acquiring unit from the driving-current storage unit; and
   an output unit that outputs a driving current value acquired by the driving-current-value acquiring unit to a driving-current control circuit that controls the driving current, which is a current required for driving the semiconductor optical amplifier serially connected to the branching device and an optical delay device that delays and outputs the input light branched by the branching device.

2. The light detecting apparatus according to claim 1, wherein the wavelength acquiring unit acquires the wavelength stored in the wavelength-specification storage unit using either one of the calculated transmittance and reflectance having a higher characteristic of transmitted light intensity or reflected light intensity.

3. The light detecting apparatus according to claim 1, wherein the input light intensity is controlled to compensate wavelength dependency of an optical receiver arranged at a subsequent stage of the semiconductor optical amplifier.

4. An output light intensity controller comprising:
   an optical coupler that branches an input light;
   an optical delay device that receives the input light branched by the optical coupler, and delays and outputs the received input light;
   a semiconductor optical amplifier that amplifies and outputs an output light output from the optical delay device;
   a light detecting apparatus that receives the input light branched by the optical coupler, and determines and outputs a driving current value based on the received input light; and
   a driving-current control circuit that drives and controls the semiconductor optical amplifier based on the driving current value output by the light detecting apparatus, wherein
   the light detecting apparatus comprises:
   a wavelength-specification storage unit that stores a wavelength specified based on transmittance and reflectance of light in association with the transmittance and the reflectance;
   a driving-current storage unit that stores a driving current value indicating a current value required for driving the semiconductor optical amplifier for each gain value corresponding to an input light intensity, which is an intensity of light, in association with the wavelength;
   a wavelength acquiring unit that receives the input light branched by the optical coupler, to calculate transmittance and reflectance of the received input light, and acquires a wavelength corresponding to the calculated transmittance and reflectance from the wavelength-specification storage unit;
   a driving-current-value acquiring unit that calculates a gain value corresponding to the input light intensity, which is an intensity of the input light received from the optical coupler, and acquires a driving current value corresponding to a calculated gain value and a wavelength acquired by the wavelength acquiring unit from the driving-current storage unit; and
   an output unit that outputs a driving current value acquired by the driving-current-value acquiring unit to the driving-current control circuit that controls the driving current, which is a current required for driving the semiconductor optical amplifier serially connected to the optical coupler and the optical delay device.

* * * * *